March 15, 1966  G. BOWYER  3,240,357
REMOTE CONTROL MANIPULATOR
Filed June 19, 1963  3 Sheets-Sheet 2

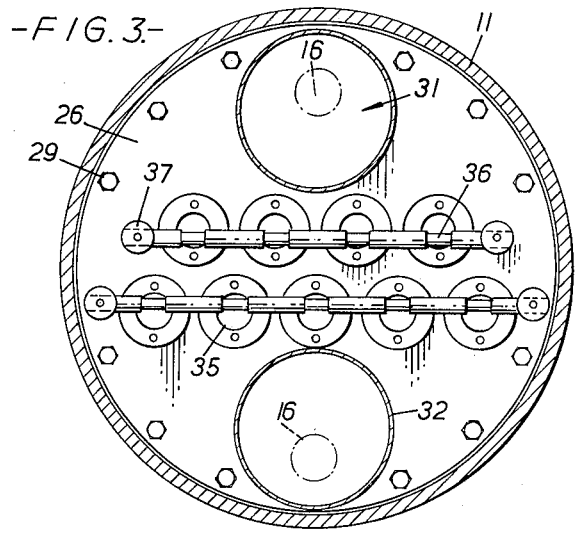
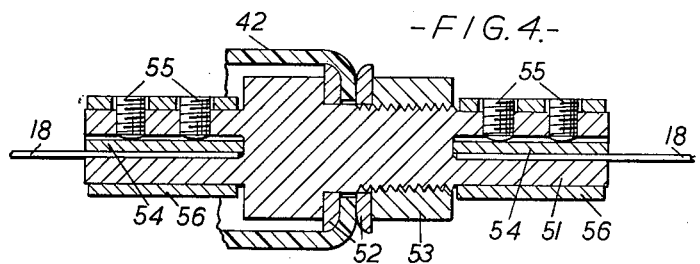

United States Patent Office 3,240,357
Patented Mar. 15, 1966

3,240,357
REMOTE CONTROL MANIPULATOR
Gordon Bowyer, Altrincham, England, assignor to United Kingdom Atomic Energy Authority, London, England
Filed June 19, 1963, Ser. No. 288,991
Claims priority, application Great Britain, June 25, 1962, 24,289/62
4 Claims. (Cl. 214—1)

This invention relates to remote-control manipulators whereby objects, such as radioactive materials, can be manipulated in a shielded cabinet by an operator standing outside the cabinet and viewing the object through a window in the cabinet shielding.

In a remote-control manipulator having a transverse beam and flexible lines passing through the beam to interconnect mechanically control means at one end and work handling means at the other end of the beam, the present invention provides a gas-tight (and thus alpha-particle-tight) seal between the lines and the beam comprising a plate sealed transverse the beam, bores in the plate through which the lines pass, flexible gas-tight sleeves, for example bellows, each sealed at one end to the plate and at the other end to each line, and a rigidly supported tubular guide for each sleeve, the guide being so dimensioned as to maintain coaxiality of the sleeve and the line. The lines may be flexible tapes or cables, for example.

One construction of manipulator embodying the invention will now be described by way of example with reference to the accompanying drawings in which:

FIGURE 3 is a section on line 3—3 of FIGURE 2, and

FIGURE 4 is a sectional view of a detail of FIGURE 2.

Figure 1:
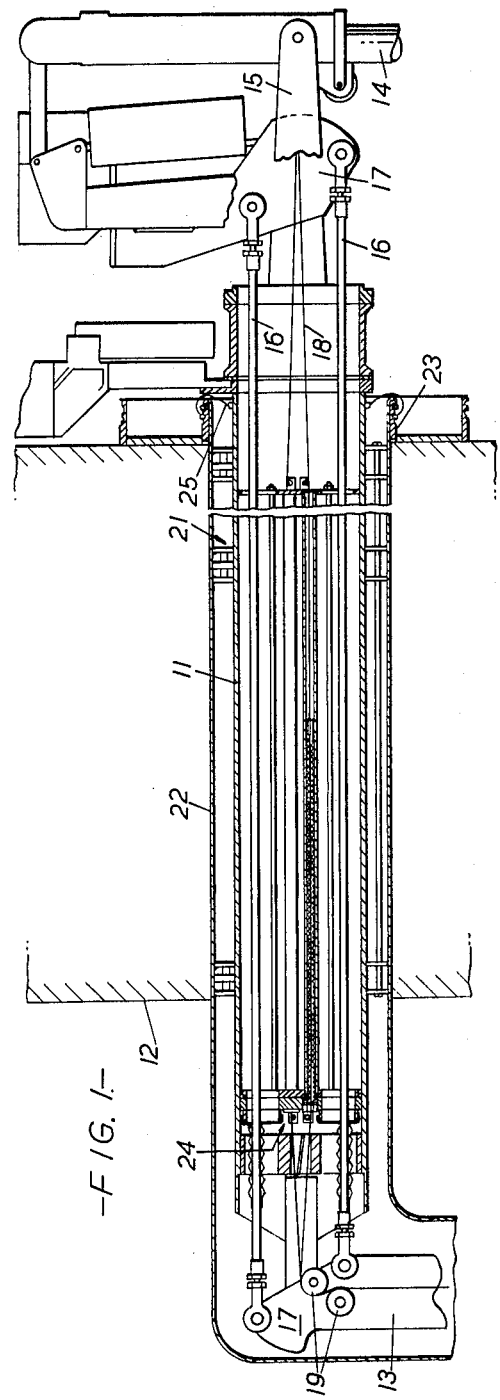
FIGURE 1 is a sectional view of the beam of the manipulator.

A transverse tubular beam 11 (FIGURE 1) extending through a socket in a wall 12 of a shielded cabinet carries at one end within the cabinet a slave arm 13 and at the other end a master arm 14. These arms being conventional are not shown in detail; their construction may be as disclosed in British patent specification No. 815,515 (D. G. Jelatis). The arms are pivoted at their upper ends to brackets 15 carried at each end of the beam and are interconnected by tie rods 16 which by means of bell crank levers 17 cause the arms to pivot together about their pivots in the brackets 15. Tapes 18 extend through the beam and over rollers at each end (only the rollers 19 at the slave end are shown) for the purpose of transmitting control signals from control mechanism carried by the master arm to work handling mechanism carried by the slave arm. There are nine tapes altogether.

The beam is supported by bearings 21 for rotation in the wall socket and is enclosed in a polyvinyl chloride (p.v.c.) sleeve 22 which is open at the master end (right-hand in FIGURE 1) of the beam but which extends on the slave arm down to the work handling mechanism to which it is sealed. At its open end the sleeve is sprung into an annular groove in a tubular member 23 projecting from the wall. The purpose of this sleeve, which is pressure-tight, is to prevent the escape of harmful particles (such as alpha particles) from the shielded cabinet.

For the avoidance of any risk of escape of harmful particles a second barrier is provided. If the sleeve 22 should leak, any harmful particles are retained by the second barrier. This second barrier is provided by a device 24 which makes a pressure-tight seal across the interior of the beam 11 with its rods 16 and tapes 18, and a p.v.c. gaiter 25 which is sprung over the master end of the beam and into a second annular groove in the projecting member 23; the gaiter 25 prevents escape of particles through the annular space between the beam and the wall socket.

Figure 2:
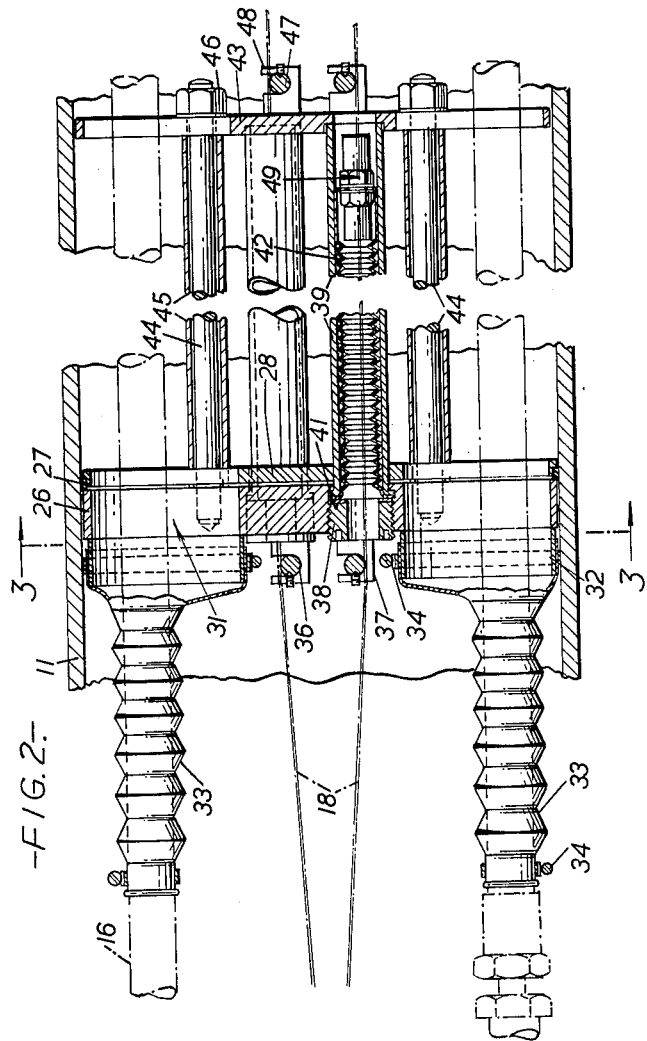
FIGURE 2 is an enlarged sectional view of part of FIGURE 1.

The sealing device 24 is shown in more detail in FIGURES 2 and 3. The device comprises a mild steel plate 26 which is secured transverse the interior of the beam 11 and sealed into the beam by a rubber sealing ring 27 compressed between the seal plate 26 and an aluminum back plate 28 by means of studs carried by the back plate which project through the seal plate and cap-nuts 29 screwed onto them; sealing rings (not shown) between the cap-nuts and the seal plate prevent leakage around the studs. Two bores 31 through the seal plate for the tie rods 16 are large enough to allow transverse movement of the rods which form part of a parallel linkage between the master and slave arms. A mild steel ring 32 is welded to the seal plate around each bore 31. Each tie rod 16 is sealed to the seal plate 26 by means of a p.v.c. bellows 33 sealed by hose clips 34 at one end to the rod 16 and at the other end to the ring 32. The bellows 33 are shaped to allow the necessary transverse movement of the rods 16.

Nine bores 35 (in two rows of four and five bores each) allow passage of the tapes 18 through the seal plate. The tapes are divided and guided through the bores by stainless steel rollers 36 supported in front of the seal plate by mild steel brackets 37. Into each bore 35 is screwed a threaded mild steel plug 38 which bears against an out-turned flange at one end of an aluminum guide tube 39, clamping between the plug and the flange a washer 41 and one end of an elongate rubber bellows 42 by which a seal is made between a tape and the seal plate. Thus each bore 35 is threaded with one tape and has associated with it one rubber bellows housed in a guide tube 39.

At its other end each guide tube is supported by an aluminum support plate 43 which extends across the interior of the beam but is not sealed to the beam. The support plate is spaced from the seal plate by tie studs 44 carried by the seal plate and distance tubes 45 extending between the seal plate and the support plate. Nuts 46 secure the support plate to the tie studs. The support plate is bored to allow passage of the rods 16 and tapes 18 and carries rollers 47 and brackets 48 similar to those carried by the seal plate.

The end of each rubber bellows 42 remote from the seal plate 26 is secured to its corresponding tape 18 by means of a carrier 49 shown in greater detail in FIGURE 4. Each carrier has a cylindrical mild steel body 51 having a central part of larger diameter against which butt two mild steel washers 52. Between the washers is clamped the end of the rubber bellows 42, the washers being rounded to avoid damage to the bellows. A mild steel nut 53 is screwed on to the body to clamp the washers and the end of the rubber bellows together. Each end of the body is slotted to receive the ends of a tape 18. The tape is clamped at each end by means of a mild steel strip 54 onto which bear two grub screws 55. A mild steel sleeve 56 slid over each end of the carrier body prevents the slots opening when the grub screws are tightened.

Leakage of alpha particles through the beam, therefore, is prevented by the seal plate, the bellows 33 for the tie rods and the rubber bellows 42 for each tape. The rubber bellows have to extend to a great length to accommodate tape movements and are guided by the guide tubes 39 which are so dimensioned that they maintain coaxially of the bellows and the tape. The length of the bellows provided in the embodiment now described by way of example is nineteen inches closed and fifty-seven inches extended. In order to control the movement of each bellows, each guide tube is dimensioned to fit snugly around the bellows over its whole length.

It is to be understood that the present invention is not limited to the details of the foregoing example. For instance there may be cables or other flexible lines extending through the beam in place of the tapes. Furthermore, although in the foregoing example the bellows are separately sealed to the seal plate 26, it may be convenient to unite all the bellows to a single flexible pad which is sealed to the seal plate 26, such an arrangement enables the bellows to be grouped closer together.

I claim:

1. A remote-control manipulator having a transverse beam, control means at one end of the beam, work handling means at the other end of the beam, flexible lines to interconnect mechanically the control means and the work handling means, and a gas-tight seal between the lines and the beam comprising a plate sealed transverse the beam, bores in the plate through which the lines pass, flexible gas-tight sleeves each sealed at one end to the plate and at the other end to a line, and a rigidly supported tubular guide for each flexible sleeve, said guide being so dimensioned as to maintain coaxially of the flexible sleeve and the flexible line.

2. A remote-control manipulator having a transverse beam, control means at one end of the beam, work handling means at the other end of the beam, flexible lines to interconnect mechanically the control means and the work handling means, and a gas-tight seal between the flexible lines and the beam comprising a plate sealed transverse the beam, bores in the plate through which the flexible lines pass, a carrier secured to each flexible line, gas-tight bellows each sealed at one end to the plate and at the other end to a carrier, and a rigidly supported tubular guide for receiving each bellows, the guide being so dimensioned as to maintain coaxiality of the bellows and the line.

3. A remote-control manipulator having a transverse beam, control means at one end of the beam, work handling means at the other end of the beam, flexible lines to interconnect mechanically the control means and the work handling means, and a gas-tight seal between the flexible lines and the beam comprising a plate sealed transverse the beam, bores in the plate through which the flexible lines pass, a carrier secured to each line, gas-tight bellows each sealed at one end to the plate and at the other end to a carrier, a support plate mounted within the beam and axially spaced from the transverse plate, and a tubular guide for each bellows which is rigidly supported between the transverse plate and the support plate and is so dimensioned as to maintain coaxially of the bellows and the line.

4. A remote-control manipulator having a transverse beam, control means at one end of the beam, work handling means at the other end of the beam, flexible lines to interconnect mechanically the control means and the work handling means, and a gas-tight seal between the flexible lines and the beam comprising a plate sealed transverse the beam, bores in the plates through which the flexible lines pass, a carrier secured to each line, a gas-tight bellows each sealed at one end to the plate and at the other end to a carrier, a support plate mounted within the beam and axially spaced from the transverse plate, rolling guides for the lines which are carried by the transverse plate and the support plate, and a tubular guide for each bellows which is rigidly supported between the transverse plate and the support plate and is so dimensioned as to maintain coaxiality of the bellows and the line.

References Cited by the Examiner

UNITED STATES PATENTS 2,764,301 9/1956 Goertz et al.
3,019,663 2/1962 Breunich _____ 74—18.2

GERALD M. FORLENZA, *Primary Examiner.*

HUGO O. SCHULZ, *Examiner.*